US012062246B2

(12) United States Patent
Prebble

(10) Patent No.: US 12,062,246 B2
(45) Date of Patent: Aug. 13, 2024

(54) EXTRACTING TEXT FROM AN IMAGE

(71) Applicant: Konica Minolta Business Solutions U.S.A., Inc., San Mateo, CA (US)

(72) Inventor: Tim Prebble, Longmont, CO (US)

(73) Assignee: Konica Minolta Business Solutions U.S.A., Inc., San Mateo, CA (US)

( * ) Notice: Subject to any disclaimer, the term of this patent is extended or adjusted under 35 U.S.C. 154(b) by 377 days.

(21) Appl. No.: 17/490,770

(22) Filed: Sep. 30, 2021

(65) Prior Publication Data

US 2023/0094651 A1 Mar. 30, 2023

(51) Int. Cl.
*G06V 30/18* (2022.01)
*G06F 18/2431* (2023.01)
*G06T 7/11* (2017.01)
*G06T 7/13* (2017.01)
*G06T 11/00* (2006.01)

(52) U.S. Cl.
CPC .......... *G06V 30/18* (2022.01); *G06F 18/2431* (2023.01); *G06T 7/11* (2017.01); *G06T 7/13* (2017.01); *G06T 11/00* (2013.01)

(58) Field of Classification Search
None
See application file for complete search history.

(56) References Cited

U.S. PATENT DOCUMENTS

| 6,704,449 B1 | 3/2004 | Ratner | |
|---|---|---|---|
| 6,735,335 B1* | 5/2004 | Liu | G06V 30/40 382/175 |
| 10,863,038 B1* | 12/2020 | Tokuda | H04N 1/0001 |
| 2002/0039438 A1* | 4/2002 | Mori | G06T 7/32 382/199 |
| 2005/0180645 A1* | 8/2005 | Hasegawa | H04N 1/40062 382/302 |
| 2006/0239454 A1* | 10/2006 | Kwon | H04N 1/4072 380/54 |
| 2007/0070443 A1 | 3/2007 | Kim | |
| 2007/0160295 A1 | 7/2007 | Wang et al. | |

(Continued)

OTHER PUBLICATIONS

Bidgoli, A. M., and M. Boraghi. "A language independent text segmentation technique based on Naive Bayes classifier." 2010 International Conference on Signal and Image Processing. IEEE, 2010. (Year: 2010).*

(Continued)

*Primary Examiner* — Michelle M Entezari Hausmann
(74) *Attorney, Agent, or Firm* — Osha Bergman Watanabe & Burton LLP

(57) ABSTRACT

A method for extracting text from an input image and generating a document includes: generating an edges mask from the input image; generating an edges image that is derived from the edges mask; identifying, within the edges mask, one or more probable text areas; extracting a first set of text characters by performing a first optical character recognition (OCR) operation on each of one or more probable text portions, of the derived edges image, corresponding to each of the probable text areas; generating a modified image by erasing, from the input image, image characters corresponding to the first set of text characters extracted by the first OCR operation; and generating a document by overlaying the extracted first set of text characters on the modified image.

20 Claims, 9 Drawing Sheets

Probable Text Area
710

(56) References Cited

U.S. PATENT DOCUMENTS

| | | | |
|---|---|---|---|
| 2009/0060330 A1* | 3/2009 | Liu | G06V 10/267 |
| | | | 382/254 |
| 2009/0110287 A1 | 4/2009 | Bates et al. | |
| 2009/0148043 A1 | 6/2009 | Ophir et al. | |
| 2009/0273597 A1* | 11/2009 | Chatamballi | G06F 11/3692 |
| | | | 345/418 |
| 2010/0119113 A1* | 5/2010 | Kuleschow | G06T 7/187 |
| | | | 382/103 |
| 2013/0236099 A1* | 9/2013 | Yu | G06T 7/248 |
| | | | 382/171 |
| 2014/0072219 A1 | 3/2014 | Tian | |
| 2015/0206318 A1* | 7/2015 | Parfenov | G06T 5/50 |
| | | | 382/199 |
| 2016/0004682 A1* | 1/2016 | Nakatsuka | G06V 30/147 |
| | | | 715/228 |
| 2016/0026859 A1* | 1/2016 | Chiba | G06V 10/44 |
| | | | 382/199 |
| 2017/0200296 A1* | 7/2017 | Jones | G09G 5/02 |
| 2021/0103750 A1* | 4/2021 | Cai | G06N 3/04 |
| 2021/0124971 A1* | 4/2021 | Corfield | G06F 40/166 |

OTHER PUBLICATIONS

Gllavata, Julinda, Ralph Ewerth, and Bernd Freisleben. "A robust algorithm for text detection in images." 3rd International Symposium on Image and Signal Processing and Analysis, 2003. ISPA 2003. Proceedings of the. vol. 2. IEEE, 2003. (Year: 2003).*
Gleichman, Sivan, et al. "Detection and segmentation of antialiased text in screen images." 2011 International Conference on Document Analysis and Recognition. IEEE, 2011. (Year: 2011).*

* cited by examiner

Edges Mask
400
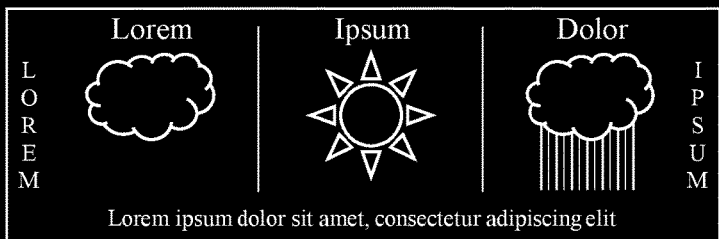
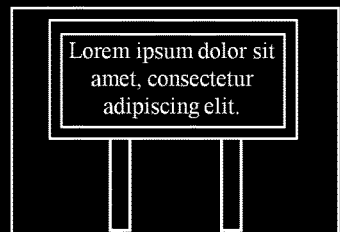
FIG. 4

Edges Image
500

Lorem Ipsum Dolor

Lorem ipsum dolor sit

Lorem ipsum dolor sit amet, consectetur adipiscing elit, sed do eiusmod tempor incididunt ut labore et dolore magna aliqua. Ut enim ad minim veniam.

Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat.

Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat.

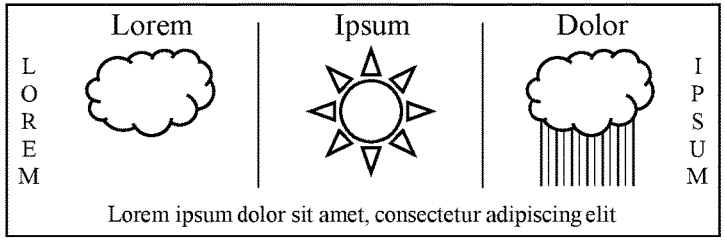

Lorem ipsum dolor sit amet, consectetur adipiscing elit

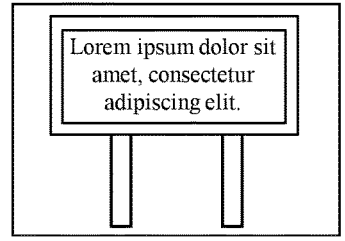

FIG. 5

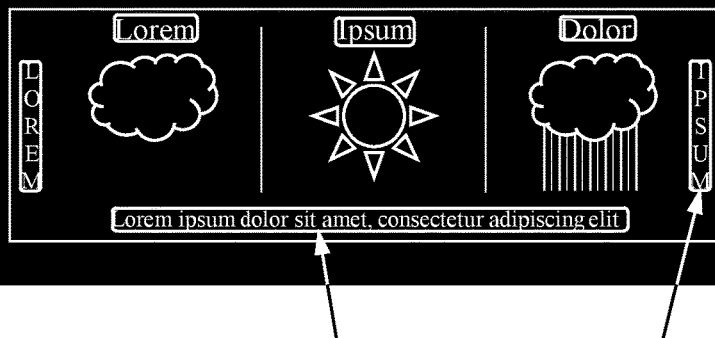
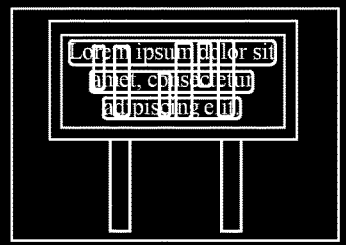
Horizontal Candidate Lines of Text 610      Vertical Candidate Lines of Text 620
FIG. 6

Probable Text Area
710

EXTRACTING TEXT FROM AN IMAGE

BACKGROUND

Digital images, whether natural images originating from a camera, or synthetic images that are generated by a computer, may include text information. Digital representations of physical documents may be based on images, for example the result of a scanning process. It is often useful to extract the text characters from these images so that they can be further processed by computer algorithms. It is also often useful to extract the text characters from digital images in order to generate a document, that includes the image, but where the text from the image can be edited. Optical Character Recognition (OCR) operations are often unable to generate high quality results when extracting text that is embedded in natural or synthetic digital images.

SUMMARY

In general, one or more embodiments of the invention relate to a method for extracting text from an input image and generating a document. The method comprises: generating an edges mask from the input image, wherein the edges mask comprises a binary image marking edges of features within the input image; generating an edges image that is derived from the edges mask; identifying, within the edges mask, one or more probable text areas, wherein the probable text areas are polygons where a predetermined percentage of marked pixels are within potential horizontal or vertical text lines; extracting a first set of text characters by performing a first optical character recognition (OCR) operation on each of one or more probable text portions, of the derived edges image, corresponding to each of the probable text areas; generating a modified image by erasing, from the input image, image characters corresponding to the first set of text characters extracted by the first OCR operation; and generating a document by overlaying the extracted first set of text characters on the modified image.

In general, one or more embodiments of the invention relate to a non-transitory computer readable medium (CRM) storing computer readable program code for extracting text from an input image and generating a document. The computer readable program code causes a computer to: generate an edges mask from the input image, wherein the edges mask comprises a binary image marking edges of features within the input image; generate an edges image that is derived from the edges mask; identify, within the edges mask, one or more probable text areas, wherein the probable text areas are polygons where a predetermined percentage of marked pixels are within potential horizontal or vertical text lines; extract a first set of text characters by performing a first optical character recognition (OCR) operation on each of one or more probable text portions, of the derived edges image, corresponding to each of the probable text areas; generate a modified image by erasing, from the input image, image characters corresponding to the first set of text characters extracted by the first OCR operation; and generate a document by overlaying the extracted first set of text characters on the modified image.

In general, one or more embodiments of the invention relate to a system for extracting text from an input image and generating a document. The system comprises: a memory; and a processor coupled to the memory, wherein the processor: generates an edges mask from the input image, wherein the edges mask comprises a binary image marking edges of features within the input image; generates an edges image that is derived from the edges mask; identifies, within the edges mask, one or more probable text areas, wherein the probable text areas are polygons where a predetermined percentage of marked pixels are within potential horizontal or vertical text lines; extracts a first set of text characters by performing a first optical character recognition (OCR) operation on each of one or more probable text portions, of the derived edges image, corresponding to each of the probable text areas; generates a modified image by erasing, from the input image, image characters corresponding to the first set of text characters extracted by the first OCR operation; and generates a document by overlaying the extracted first set of text characters on the modified image.

Other aspects of the invention will be apparent from the following description and the appended claims.

BRIEF DESCRIPTION OF DRAWINGS

FIG. 4 shows an illustration of an edges mask in accordance with one or more embodiments of the invention.

FIG. 5 shows an illustration of an edges image in accordance with one or more embodiments of the invention.

FIG. 6 shows an illustration of candidate horizontal and vertical lines of text identified on the edges mask in accordance with one or more embodiments of the invention.

DETAILED DESCRIPTION

Figure 1:
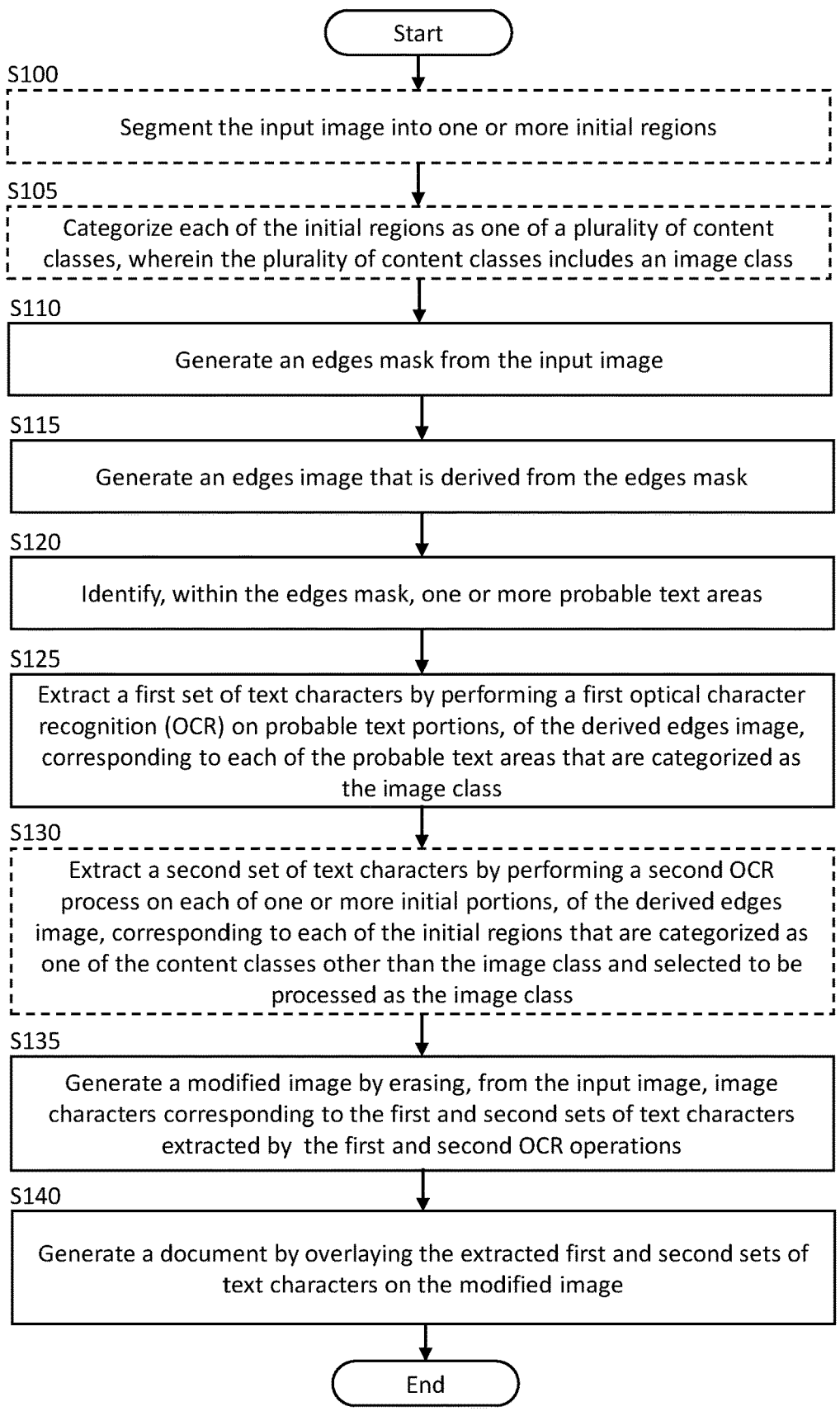
FIG. 1 shows a flowchart of a method for extracting text from an image and generating a document in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g. first, second, third) may be used as an adjective for an element (i.e., any noun in the application). The use of ordinal numbers is not to imply or create a particular ordering of the elements nor to limit any element to being only a single element unless expressly disclosed, such as by the use of the terms "before," "after," "single," and other such terminology. Rather the use of ordinal numbers is to distinguish between the elements. By way of an example, a first element is distinct from a second element, and the first element may encompass more than one element and may succeed (or precede) the second element in an ordering of elements.

In general, embodiments of the invention provide a method, non-transitory computer readable medium (CRM), and system for extracting text from an input image and generating a document where the extracted text is reproduced as editable text. The input image is optionally segmented into regions corresponding to classes of content. Regions corresponding to images (or corresponding to other content classes designated to be processed as images) are processed in order to improve the efficacy accuracy with which OCR operations can extract text from these regions. Specifically, an edges mask, or a binary image marking the edges of features, are generated from an input image. The edges mask is used to generate an edges image, which marks the same edges as the edges mask, but the markings are colorized pixels from the input image. Within the edges mask, probable text areas, or polygonal areas that are likely to contain text are identified by identifying groups of candidate lines of text and then checking that a predetermined percentage of marked pixels occur within the candidate lines of text. OCR operations are then performed on the probable text areas. In other words, by identifying the polygonal areas that are likely to contain text within regions categorized as the image class, and limiting the OCR operations to those areas, the OCR operations are more likely to successfully extract the text within the image regions.

FIG. 1 shows a flowchart of a method for extracting text from an image and generating a document in accordance with one or more embodiments of the invention. In one or more embodiments of the invention, one or more of the steps shown in FIG. 1 may be combined, omitted, repeated, and/or performed in a different order than the order shown in FIG. 1. Accordingly, the scope of the invention should not be considered limited to the specific arrangement of steps shown in FIG. 1.

In optional STEP S100, an input image is optionally segmented into one or more initial regions. Prior to segmentation, the input image 300 may be obtained (e.g., downloaded, scanned, captured, imaged, etc.) from any source. The input image 300 may be a photograph, a computer generated image, a document, a scan of a physical document or any other type of image. The initial regions are polygonal regions of the input image containing various types of content including, but not limited to, images, text, tables, charts, flowcharts, and vector graphics.

In optional STEP S105, each of the initial regions are categorized into various content classes corresponding to the type of content contained within the region. The possible content classes may include an image class, a text class, a table class, a chart class, a flowchart class, and a vector graphics class. In one or more embodiments, some or all of the classes listed above are not necessary, and similarly, additional classes to those listed above may also be included.

In STEP S110, an edges mask is generated from the input image. The edges mask is a binary image that marks the edges of features within the input image. A binary image is an image where each pixel of the image has one of only two possible values, typically represented as a black and white image, although other representations may be also be used.

The edges mask may be generated by any edge-finding process, but in one or more embodiments, the process is as follows:

The input image is converted to grayscale, where white pixels are output as white, and non-white pixels will be expressed as a shade of gray. In other words, each pixel has a value that ranges from zero to a maximum pixel value. The maximum pixel value represents white, zero represents black, and values between zero and the maximum pixel value represent shades of gray.

This grayscale image is then inverted such that each pixel of the inverted grayscale image has a value obtained by subtracting the grayscale image pixel value from the maximum pixel value. In other words, white pixels become black pixels, black pixels become white pixels, and pixels containing a shade of gray become the complementary shade of gray with respect to the maximum pixel value.

A binary image is then generated from the inverted grayscale image by applying an adaptive thresholding process. Specifically each pixel of the binary image is set to the maximum value if the value of the corresponding pixel from the inverted grayscale image is greater than a threshold value, where the threshold value is determined for each pixel of the inverted grayscale image. Otherwise, the pixel is set to a value of zero. The threshold value can be determined in various ways, but in one or more embodiments, the threshold value is determined by performing a Gaussian-weighted sum of the neighboring pixels and subtracting a small negative constant value from this sum. The small constant value may be chosen to be various values. In one or more embodiments, the maximum pixel value may be 255, and the constant value may be set at −15. Which neighboring pixels are included in the Gaussian-weighted sum may be selected by various metrics. In one or more embodiments, the neighboring pixels may be chosen to be within a square-shaped block of pixels of a size that is 2% of the smallest dimension of the image. Alternatively, a number of neighboring pixels may be chosen that is independent of the size of the image. By determining the threshold value in the manner described above (using a Gaussian-weighted sum and subtracting a small negative constant from this sum) edges of the input image with sharp, high contrast boundaries, including text characters, will tend to be marked prevalently over areas filled with constant or near-constant color values.

The binary image may be further processed to remove noise to make the final edges mask. Noise can be removed by identifying connected components, or marked pixels that are continuously connected to each other, and removing any connected components that are small (for example, a width and height of 2 or fewer pixels, or 3 or fewer marked pixels that are connected).

In STEP S115, an edges image is generated, where the edges image is derived from the edges mask. In one or more embodiments, this derived edges image may be the same as the edges mask.

In one or more embodiments, the derived edges image may also be generated by placing input image pixels, on a blank background, at positions corresponding to the marked edges in the edges mask. In other words, the color or grayscale values from the input image are inserted at each marked pixel of the edges mask, producing a colorized or grayscale version of the edges mask. The colorized or grayscale edges are set on a blank background which is typically chosen to be white.

In STEP S120, one or more probable text areas are identified within the edges mask. The probable text areas are polygons where a predetermined percentage of the marked pixels are within potential horizontal and vertical text lines. More information is provided about the identification of the probable text areas in the description of FIG. 2 below.

In STEP S125 a first set of text characters is extracted by performing a first OCR operation. The first OCR operation is performed on each of one or more probable text portions, of the derived edges image, corresponding to each of the probable text areas. In other words, the first OCR operation is performed on the edges image, and only in portions of the edges image that correspond to the probable text areas of the edges mask. As stated above, in one or more embodiments, the edges image may be the same as the edges mask, and in other embodiments the edges image is a colorized version of the edges mask. In this way, by limiting the first OCR operation to only be performed within each individual portion of the edges image that is determined to be likely to contain text, the results of the OCR operation may be more accurate. An OCR operation may be any optical character recognition process, any intelligent character recognition (ICR) process, or any other process that extracts text characters from an image.

In one or more embodiments, STEP S125 is performed only within the probable text portions of the edges image that are also within the boundaries of the initial regions, of the input image, that were categorized as the image class in optional STEP S105. In other embodiments, the entire input image may be treated as one initial region of the image class, and therefore STEP S125 will be applied to the entire input image.

In optional STEP S130 a second set of text characters is extracted by performing a second OCR operation on each of one or more initial portions of the derived edges image. Each of these initial portions corresponds to an initial region of the input image that is 1) categorized as one of the content classes other than the image class, and 2) selected to be processed as the image class. In contrast with the first OCR operation of STEP S125, the second OCR operation is not constrained to be performed only with the probable text areas. Instead, the second OCR operation is performed on the entire portion of the edges image that corresponds to each initial region selected to be processed as the image class. In one or more embodiments, these non-image initial regions are selected to be processed as the image class when a text extraction process, determined by the content class of the initial region, is attempted but fails. In other words, if, for example, an initial region is categorized as the flowchart class, but a flowchart text extraction process fails, it may be selected to be processed as an image. In such a case, the second OCR operation is performed on a portion of the edges image corresponding to the entire flowchart-class initial region.

In STEP S135, a modified image is generated by erasing, from the input image, image characters corresponding to the first and second sets of text characters extracted by the first and second OCR operations. In other words, the characters in the input image, corresponding to each text character that was extracted in STEPS S125 and S130, are erased from the input image. Any erasing process could be used in this step, however in one or more embodiments, the following process is used. For each character in the image corresponding to a text character extracted by OCR, a bounding box is defined as a rectangular box surrounding the image character. Within the bounding box, the color or grayscale value is determined by an interpolation process applied to the pixels immediately outside the bounding box. For example, given a character bounding box with an inclusive upper left corner at coordinates (x, y) and an exclusive lower right corner at coordinates (x+w, y+h), the new value for pixel (x+j, y+i), where $0 \leq j < w$ and $0 \leq i < h$, is set to the value of an interpolation function based on the values of the pixels just outside the four corners of the bounding box. In this way, the image characters are removed from the original input image while preserving the look of the background underlying the characters.

In STEP S140 a new document is generated by overlaying the extracted first and second sets of text characters on the modified image. In one or more embodiments, this may involve producing a container to hold both the text characters and the modified image. For example, in one or more embodiments, a Microsoft Word document may be generated, and the modified image may be placed into a group with a block of text characters, corresponding to a particular probable text area extracted in STEP S125. Similarly, another block of text characters, corresponding to a particular non-image class initial region, may also be placed into the group in the Microsoft Word Document. In this way the position of the text blocks and the modified image can be positioned relatively to each other in a way that approximates the positioning of the original characters on the input image.

Figure 2:
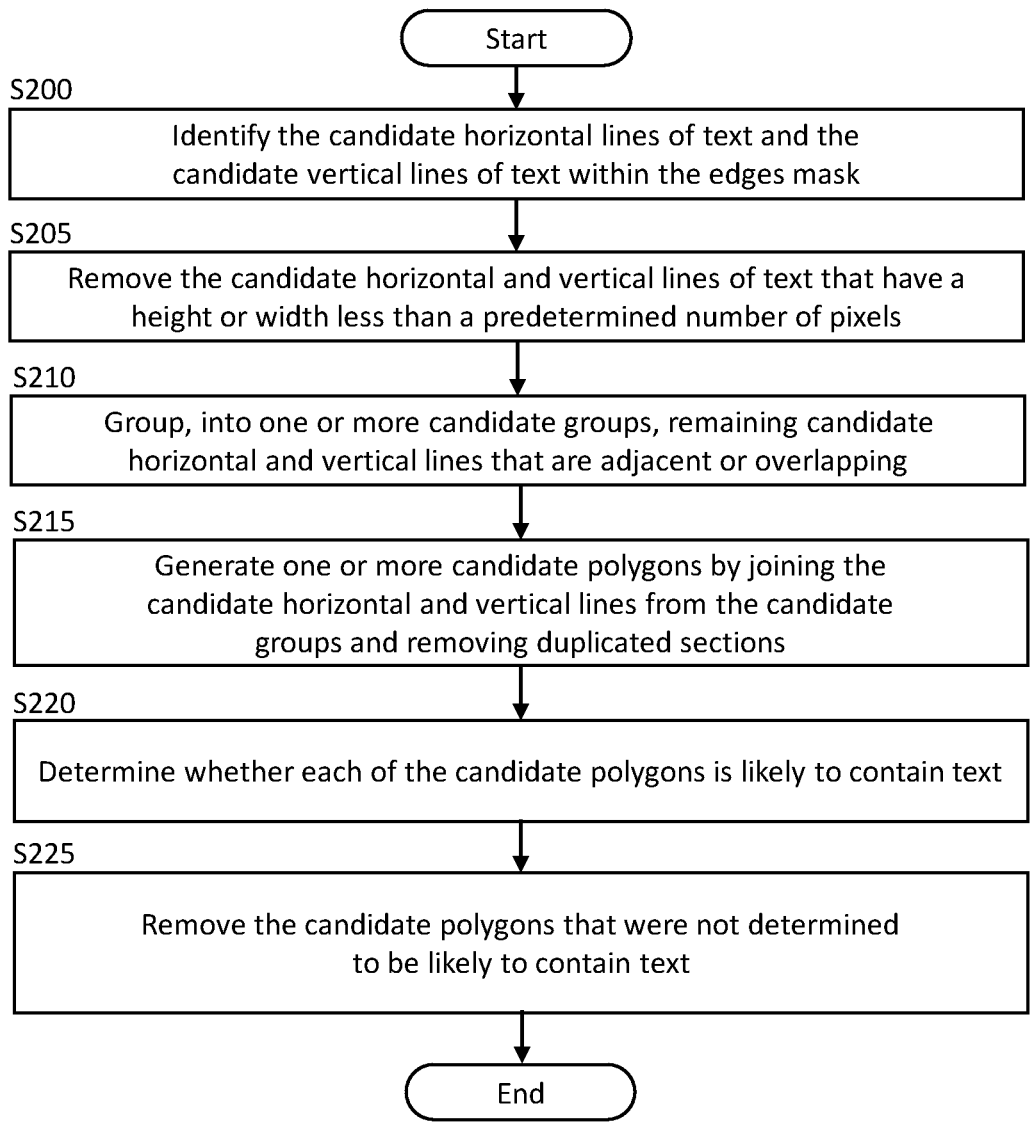
FIG. 2 shows a flowchart of a method for identifying probable text areas in accordance with one or more embodiments of the invention.

FIG. 2 shows a flowchart of a method for identifying the probable text areas of STEP S120, according to one or more embodiments of the invention. In one or more embodiments of the invention, one or more of the steps shown in FIG. 2 may be combined, omitted, repeated, and/or performed in a different order than the order shown in FIG. 2. Accordingly, the scope of the invention should not be considered limited to the specific arrangement of stems shown in FIG. 2.

In STEP S200, candidate horizontal lines of text and candidate vertical lines of text are identified within the edges mask. A candidate line of text is any single line that may correspond to a line of text characters arranged in a typical horizontal or vertical arrangement of text. One skilled in the art will recognize that there are several known processes for identifying lines of text, and any of these may be used to identify the candidate horizontal and vertical lines of text.

In STEP S205 any candidate horizontal lines of text that have a width or a height less than a predetermined number of pixels are removed, thereby reducing candidate horizontal lines of text that are too small to contain any actual text. Similarly, any candidate vertical lines of text that have a width or a height less than a predetermined number of pixels are removed, thereby reducing candidate vertical lines of text that are too small to contain text. In one or more embodiments, this predetermined number of pixels may be chosen as 6 pixels width and height, although other numbers of pixels may also be chosen.

In STEP S210 the remaining candidate horizontal and vertical lines of text that are adjacent or overlapping are grouped together in one or more candidate groups. In other words, after removing the small candidate horizontal and vertical lines of text in STEP S205, those candidate lines that were left over are grouped together if they are beside, nearby, or touching. In this way, text characters that are part of blocks of text within the input image tend to be grouped together into groups.

In STEP S215 one or more candidate polygons are generated from the groups from STEP S210. The candidate horizontal lines of text and the candidate vertical lines of text within the groups from STEP S210 are joined together, and any duplicate sections where candidate lines overlap or cross are removed. In this way candidate polygons are generated that define areas of the edges mask that may contain text.

In STEP S220 it is determined whether each of the candidate polygons from STEP S215 is likely to contain text. In order to determine whether each candidate polygon is likely to contain text, potential horizontal text lines and potential vertical text lines are identified within each candidate polygon. The horizontal and vertical text lines are areas within a candidate polygon that potentially hold horizontal or vertical text, respectively. The potential horizontal and vertical text lines may be identified by various processes for identifying lines of text within an image, but in one or more embodiments these text lines are identified using dilation and erosion operations.

Specifically, for identifying potential horizontal text lines, wide kernels may be used. Here, a kernel is a small binary array that defines a shape for performing the dilation and erosion operations. Thus a wide kernel is an array (in this case 1 array row of ones where the size of the array of ones is larger in width than in height). In the case of dilation and erosion operations, a rule is applied to every pixel of the image, and the kernel defines on what neighborhood of nearby pixels the rule is based. For dilation, if any pixel within the nearby neighborhood of a particular pixel is marked, then the particular pixel will be marked after the dilation operation. For erosion, if any pixel within the nearby neighborhood of a particular pixel is unmarked, then the pixel will be unmarked after the erosion operation. In this way one or more subsequent dilation operations will tend to combine horizontally distributed text characters in one wide line shape and subsequent erosion operations will tend to reduce the horizontal size of the line back to the original size of the line of text.

Potential vertical text lines may be found in a similar way as the potential horizontal text lines, but using kernels that are tall rather than wide (i.e. an array column of ones where the size of the array of ones is larger in height than in width). Alternatively, the edges mask or areas of the edges mask may instead be transposed such that the width and height dimensions are interchanged, effectively making vertical text lines into horizontal text lines. In this way the potential vertical text lines may also be identified using the same process used to identify the potential horizontal text lines.

Within each of the candidate polygons, the potential horizontal and vertical text lines that have a height or a width less than a second predetermined number of pixels are removed. The second predetermined number of pixels may be chosen to be any number, but in one or more embodiments the second predetermined number of pixels is chosen to be between 1 and 3 pixels.

It is determined whether each of the candidate polygons is likely to contain horizontal text by determining whether a predetermined percentage of marked pixels, within the candidate polygon, are also within remaining potential horizontal text lines. Similarly, it is determined whether each of the candidate polygons is likely to contain vertical text by determining whether the predetermined percentage of marked pixels, within the candidate polygon, are also within remaining potential vertical text lines. The predetermined percentage can be chosen to be a variety of values, but in one or more embodiments, the predetermined percentage may be chosen to be 45%. In this way, if 45% or greater of the pixels within a candidate polygon are contained within either the potential horizontal or vertical text lines associated with the candidate polygon, then it is likely that the candidate polygon contains text. However, if less than 45% of the marked pixels within a candidate polygon meet this criterion, then it is unlikely that the candidate polygon contains text because a high percentage of the content within the candidate polygon does not conform to a rough geometry of rows or columns of text. In this case it is more likely that the candidate polygon contains non-text content such as natural images or vector graphics.

In STEP S225, the candidate polygons that were not determined to be likely to contain text are removed. In this way the set of probable text areas from STEP S120 are identified.

Figure 3:
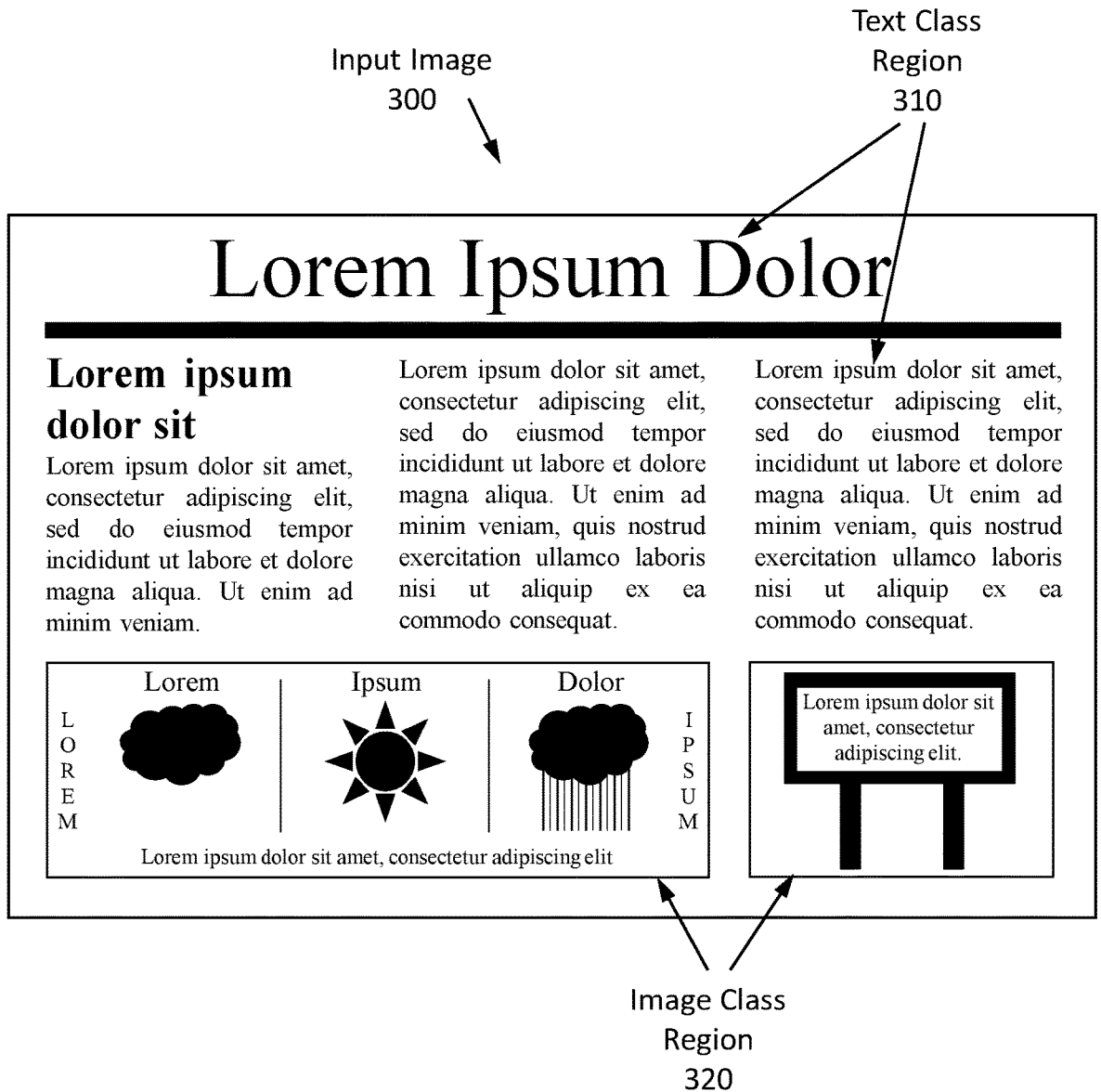
FIG. 3 shows an illustration of an input image in accordance with one or more embodiments of the invention.

FIG. 3 shows an illustration of an input image 300 according to one or more embodiments of the invention. In this example, the input image contains several text class regions 310, or initial regions that are categorized as the text class. The input image also contains several image class regions 320, or initial regions that are categorized as the image class. The input image 300 is not limited to images similar to this illustration. The input image could be any type of image that contains any number of input regions and any combination of content classes, including the case where the input image has only one initial region categorized as the image class.

FIG. 4 shows an illustration of an edges mask that may be generated by STEP S110 described above, according to one or more embodiments of the invention. The edges mask is a binary image where, in one or more embodiments, background pixels are set to black and the edges of any features withing the input image 300 are marked as white pixels.

FIG. 5 shows an illustration of an edges image 500, according to one or more embodiments of the invention. As described in the discussion of STEP S115, the edges image is derived from the edges mask 400, and in one or more embodiments, may be the same as the edges mask. In other embodiments the edges mask may be a colorized version of the edges mask where the color or grayscale values are taken from the input image 300. In this example, the derived edges image 500 is shown as black edges marked on a white background, because the input image 300 has black features on a white background.

FIG. 6 shows an illustration 600 of example candidate horizontal lines of text 610 and example candidate vertical lines of text 620 shown on the edges mask 400, according to one or more embodiments of the invention. These example horizontal and vertical lines of text 610, 620 are identified according to the discussion of STEP S200.

Figure 7:
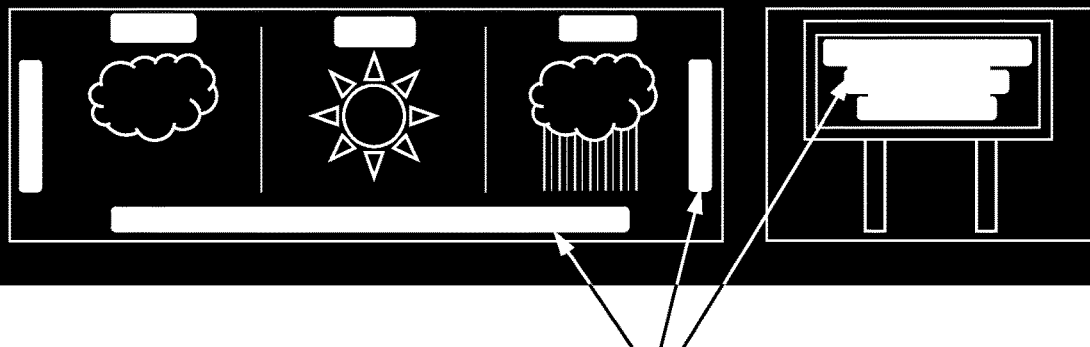
FIG. 7 shows an illustration of probable text areas identified on the edges mask in accordance with one or more embodiments of the invention.

FIG. 7 shows an illustration 700 of example probable text areas 710 shown on the edges mask 400, according to one or more embodiments of the invention. These example probable text areas are identified according to the discussion of STEPS S200-S225.

Figure 8:
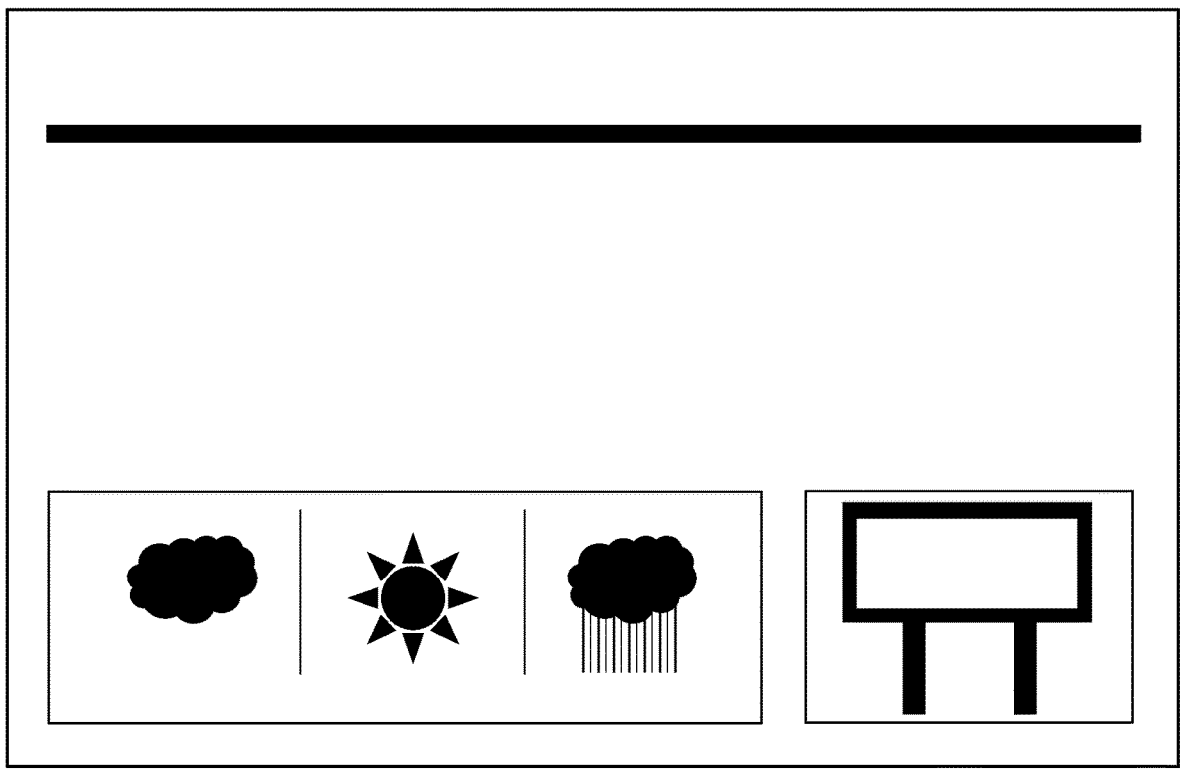
FIG. 8 shows an illustration of a modified image in accordance with one or more embodiments of the invention.

FIG. 8 shows an illustration of an example modified image 800 according to one or more embodiments of the invention. The modified image 800 is derived from the input image 300, where the characters in the input image 300 that correspond to the text characters extracted according to STEPS S125 and S130 have been erased, according to STEP S135. Blocks of the text characters extracted in STEPS S125 and S130 may be overlayed onto the modified image 800 according to STEP S140 in order produce a document that closely resembles the input image 300, but where the text is editable text.

Figure 9:
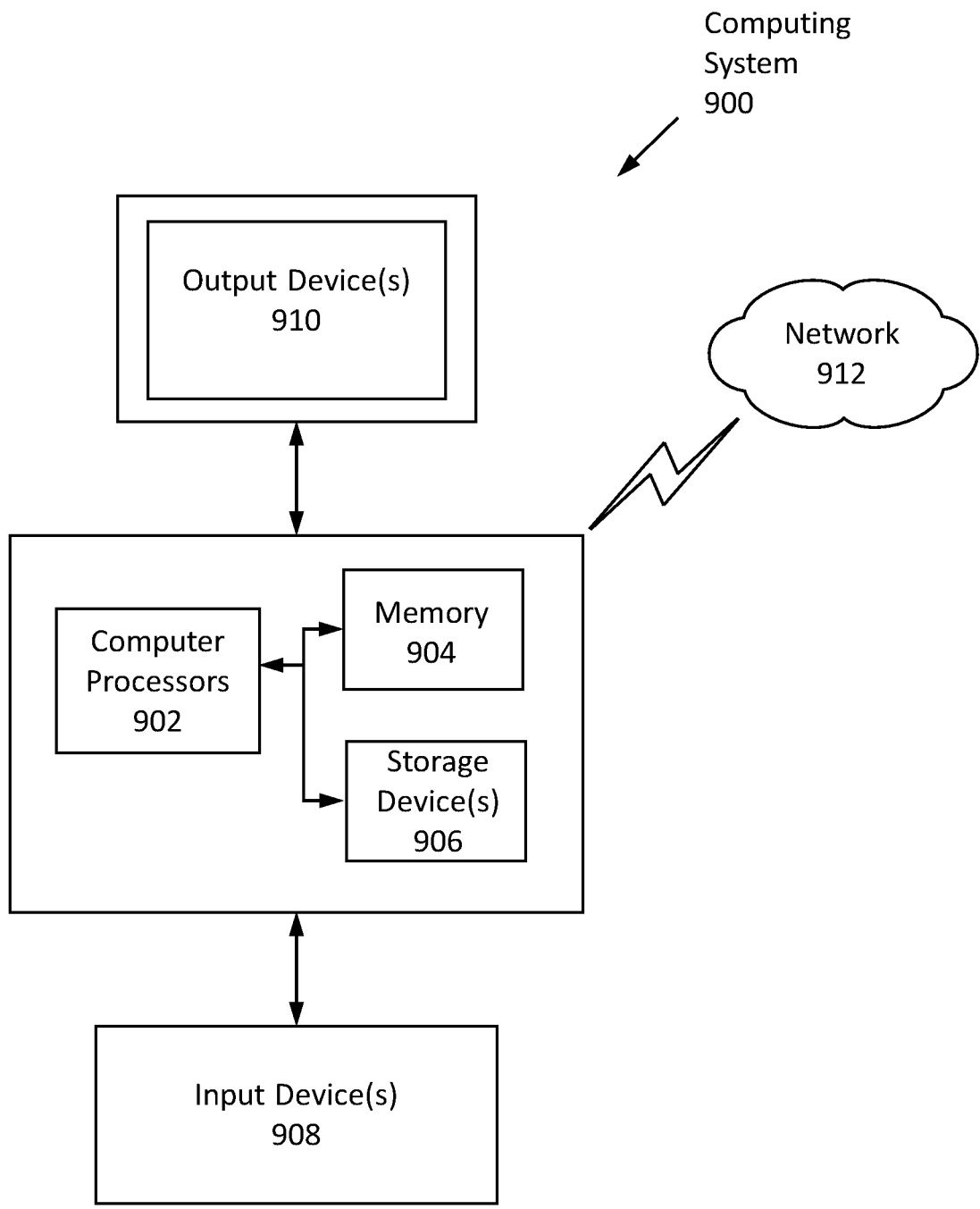
FIG. 9 shows a computing system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 9, the computing system (900) may include one or more computer processor(s) (902), associated memory (904) (e.g., random access memory (RAM), cache memory, flash memory, etc.), one or more storage device(s) (906) (e.g., a hard disk, an optical drive such as a compact disk (CD) drive or digital versatile disk (DVD) drive, a flash memory stick, etc.), and numerous other elements and functionalities. The computer processor(s) (902) may be an integrated circuit for processing instructions. For example, the computer processor(s) may be one or more cores, or micro-cores of a processor. The computing system (900) may also include one or more input device(s) (908), such as a touchscreen, keyboard, mouse, microphone, touchpad, electronic pen, or any other type of input device. Further, the computing system (900) may include one or more output device(s) (910), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (900) may be connected to a network (912) (e.g., a local area network (LAN), a wide area network (WAN) such as the Internet, mobile network, or any other type of network) via a network interface connection (not shown). The input and output device(s) may be locally or remotely (e.g., via the network (912)) connected to the computer processor(s) (902), memory (904), and storage device(s) (906). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (900) may be located at a remote location and be connected to the other elements over a network (912). Further, one or more embodiments of the invention may be implemented on a distributed system having a plurality of nodes, where each portion of the invention may be located on a different node within the distributed system. In one or more embodiments, the node corresponds to a distinct computing device. Alternatively, the node may correspond to a computer processor with associated physical memory. The node may alternatively correspond to a computer processor or micro-core of a computer processor with shared memory and/or resources.

One or more of the embodiments of the invention may have one or more of the following advantages and improvements over conventional technologies for extracting text from images: improving the efficacy and accuracy with which text characters can be extracted from natural images, photographs, computer-generated images, or any type of electronic image; improving the efficacy and accuracy with which text characters can be extracted from images that have multiple regions within the image that each contain different classes of content; improving the ability to utilize text from within images for further computer processing; and generating documents where the text is editable, but the document retains the image characteristics of the original image. One or more of the above advantages may improve a user's ability to understand, analyze, and manipulate text data within images or documents.

Although the disclosure has been described with respect to a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A method for extracting text from an input image and generating a document, the method comprising:
   generating an edges mask from the input image, wherein the edges mask comprises a binary image marking edges of features within the input image;
   generating an edges image that is derived from the edges mask, wherein the derived edges image is generated by inserting color pixel values or grayscale pixel values from the input image at each marked pixel of the edges mask;
   identifying, within the edges mask, one or more probable text areas, wherein the probable text areas are polygons where a predetermined percentage of marked pixels are within potential horizontal or vertical text lines;
   extracting a first set of text characters by performing a first optical character recognition (OCR) operation on each of one or more probable text portions, of the derived edges image, corresponding to each of the probable text areas;
   generating a modified image by erasing, from the input image, image characters corresponding to the first set of text characters extracted by the first OCR operation; and
   generating a document by overlaying the extracted first set of text characters on the modified image.

2. The method of claim 1, wherein the derived edges image is a colorized or grayscale version of the edges mask.

3. The method of claim 1, wherein the derived edges image is generated by placing input image pixels, on a blank background, at positions corresponding to the marked edges in the edges mask.

4. The method of claim 1, wherein the identifying of the one or more probable text areas further comprises:
   identifying candidate horizontal lines of text and candidate vertical lines of text within the edges mask;
   removing the candidate horizontal lines of text that have a width or a height less than a first predetermined number of pixels and removing the candidate vertical lines of text that have a width or a height less than the first predetermined number of pixels;
   grouping, into one or more candidate groups, remaining candidate horizontal and vertical lines that are adjacent or overlapping;
   generating one or more candidate polygons, wherein each of the candidate polygons is generated by joining the candidate horizontal and vertical lines from one of the candidate groups and removing duplicate sections of overlapping candidate horizontal and vertical lines;
   determining whether each of the candidate polygons is likely to contain text, further comprising:
      identifying, within each of the candidate polygons, the potential horizontal text lines and the potential vertical text lines,
      removing, within each of the candidate polygons, the potential horizontal and vertical text lines that have a width or a height less than a second predetermined number of pixels,
      determining whether each of the candidate polygons is likely to contain horizontal text by determining whether a predetermined percentage of marked pixels, within a polygonal portion of the derived edges image corresponding to the candidate polygon, are also within remaining potential horizontal text lines, and determining whether each of the candidate polygons is likely to contain vertical text by determining whether the predetermined percentage of marked pixels, within the polygonal portion of the derived edges image corresponding to the candidate polygon, are also within remaining potential vertical text lines; and removing each of the candidate polygons that was not determined to be likely to contain text.

5. The method of claim 1, further comprising:

segmenting the input image into one or more initial regions;

categorizing each of the initial regions as one of a plurality of content classes, wherein the plurality of content classes includes an image class; and extracting a second set of text characters by performing a second OCR operation on each of one or more initial portions, of the derived edges image, corresponding to each of the initial regions that are:
  categorized as one of the content classes other than the image class, and
  selected to be processed as the image class, wherein the extracting of the first set of text characters is performed only within the probable text portions, of the derived edges image, that are within each of the initial regions that are categorized as the image class, the generating of the modified image further comprises:
  erasing, from the input image, image characters corresponding to the second set of text characters extracted by the second OCR operation, and the generating of the document further comprises:
  overlaying the second set of text characters on the modified image.

6. The method of claim 5, wherein the plurality of content classes further includes:
  a text class;
  a table class;
  a chart class;
  a flowchart class; and
  a vector graphic class.

7. The method of claim 5, wherein the initial region is selected to be processed as the image class when a text extraction process, determined by the content class of the initial region, is attempted but fails.

8. A non-transitory computer readable medium (CRM) storing computer readable program code for extracting text from an input image and generating a document, the computer readable program code causes a computer to:

generate an edges mask from the input image, wherein the edges mask comprises a binary image marking edges of features within the input image;

generate an edges image that is derived from the edges mask, wherein the derived edges image is generated by inserting color pixel values or grayscale pixel values from the input image at each marked pixel of the edges mask;

identify, within the edges mask, one or more probable text areas, wherein the probable text areas are polygons where a predetermined percentage of marked pixels are within potential horizontal or vertical text lines;

extract a first set of text characters by performing a first optical character recognition (OCR) operation on each of one or more probable text portions, of the derived edges image, corresponding to each of the probable text areas;

generate a modified image by erasing, from the input image, image characters corresponding to the first set of text characters extracted by the first OCR operation; and generate a document by overlaying the extracted first set of text characters on the modified image.

9. The non-transitory CRM of claim 8, wherein the derived edges image is a colorized or grayscale version of the edges mask.

10. The non-transitory CRM of claim 8, wherein the derived edges image is generated by placing input image pixels, on a blank background, at positions corresponding to the marked edges in the edges mask.

11. The non-transitory CRM of claim 8, wherein, in identifying the one or more probable text areas, the computer readable program code further causes the computer to:

identify candidate horizontal lines of text and candidate vertical lines of text within the edges mask;

remove the candidate horizontal lines of text that have a width or a height less than a predetermined number of pixels and removing the candidate vertical lines of text that have a width or a height less than the predetermined number of pixels;

group, into one or more candidate groups, remaining candidate horizontal and vertical lines that are adjacent or overlapping;

generate one or more candidate polygons, wherein each of the candidate polygons is generated by joining the candidate horizontal and vertical lines from one of the candidate groups and removing duplicate sections of overlapping candidate horizontal and vertical lines;

determine whether each of the candidate polygons is likely to contain text, further comprising:
  identifying, within each of the candidate polygons, the potential horizontal text lines and the potential vertical text lines,
  removing, within each of the candidate polygons, the potential horizontal and vertical text lines that have a width or a height less than a second predetermined number of pixels,
  determining whether each of the candidate polygons is likely to contain horizontal text by determining whether a predetermined percentage of marked pixels, within a polygonal portion of the derived edges image corresponding to the candidate polygon, are also within remaining potential horizontal text lines, and
  determining whether each of the candidate polygons is likely to contain vertical text by determining whether the predetermined percentage of marked pixels, with the polygonal portion of the derived edges image corresponding to the candidate polygon, are also within remaining potential vertical text lines; and remove each of the candidate polygons that was not determined to be likely to contain text.

12. The non-transitory CRM of claim 8, wherein the computer readable program code further causes the computer to:

segment the input image into one or more initial regions;

categorize each of the initial regions as one of a plurality of content classes, wherein the plurality of content classes includes an image class; and extract a second set of text characters by performing a second OCR operation on each of one or more initial portions, of the derived edges image, corresponding to each of the initial regions that are:

categorized as one of the content classes other than the image class, and selected to be processed as the image class, wherein the extracting of the first set of text characters is performed only within the probable text portions, of the derived edges image, that are within each of the initial regions that are categorized as the image class, the generating of the modified image further comprises:
erasing, from the input image, image characters corresponding to the second set of text characters extracted by the second OCR operation, and the generating of the document further comprises:
overlaying the second set of text characters on the modified image.

13. The non-transitory CRM of claim 12, wherein the plurality of content classes further includes:
a text class;
a table class;
a chart class;
a flowchart class; and
a vector graphic class.

14. The non-transitory CRM of claim 12, wherein the initial region is selected to be processed as the image class when a text extraction process, determined by the content class of the initial region, is attempted but fails.

15. A system for extracting text from an input image and generating a document, the system comprising:
a memory; and
a processor coupled to the memory, wherein the processor:
generates an edges mask from the input image, wherein the edges mask comprises a binary image marking edges of features within the input image;
generates an edges image that is derived from the edges mask, wherein the derived edges image is generated by inserting color pixel values or grayscale pixel values from the input image at each marked pixel of the edges mask;
identifies, within the edges mask, one or more probable text areas, wherein the probable text areas are polygons where a predetermined percentage of marked pixels are within potential horizontal or vertical text lines;
extracts a first set of text characters by performing a first optical character recognition (OCR) operation on each of one or more probable text portions, of the derived edges image, corresponding to each of the probable text areas;
generates a modified image by erasing, from the input image, image characters corresponding to the first set of text characters extracted by the first OCR operation; and
generates a document by overlaying the extracted first set of text characters on the modified image.

16. The system of claim 15, wherein the derived edges image is a colorized or grayscale version of the edges mask.

17. The system of claim 15, wherein the derived edges image is generated by placing input image pixels, on a blank background, at positions corresponding to the marked edges in the edges mask.

18. The system of claim 15, wherein, in identifying the one or more probable text areas, the processor further:
identifies candidate horizontal lines of text and candidate vertical lines of text within the edges mask;

removes the candidate horizontal lines of text that have a width or a height less than a predetermined number of pixels and removing the candidate vertical lines of text that have a width or a height less than the predetermined number of pixels;

groups, into one or more candidate groups, remaining candidate horizontal and vertical lines that are adjacent or overlapping;

generates one or more candidate polygons, wherein each of the candidate polygons is generated by joining the candidate horizontal and vertical lines from one of the candidate groups and removing duplicate sections of overlapping candidate horizontal and vertical lines;

determines whether each of the candidate polygons is likely to contain text, further comprising:
identifying, within each of the candidate polygons, the potential horizontal text lines and the potential vertical text lines, removing, within each of the candidate polygons, the potential horizontal and vertical text lines that have a width or a height less than a second predetermined number of pixels, determining whether each of the candidate polygons is likely to contain horizontal text by determining whether a predetermined percentage of marked pixels, within a polygonal portion of the derived edges image corresponding to the candidate polygon, are also within remaining potential horizontal text lines, and determining whether each of the candidate polygons is likely to contain vertical text by determining whether the predetermined percentage of marked pixels, with the polygonal portion of the derived edges image corresponding to the candidate polygon, are also within remaining potential vertical text lines; and removes each of the candidate polygons that was not determined to be likely to contain text.

19. The system of claim 15, wherein the processor further:
segments the input image into one or more initial regions;
categorizes each of the initial regions as one of a plurality of content classes, wherein the plurality of content classes includes an image class; and
extracts a second set of text characters by performing a second OCR operation on each of one or more initial portions, of the derived edges image, corresponding to each of the initial regions that are:
categorized as one of the content classes other than the image class, and
selected to be processed as the image class, wherein the extracting of the first set of text characters is performed only within the probable text portions, of the derived edges image, that are within each of the initial regions that are categorized as the image class, the generating of the modified image further comprises:
erasing, from the input image, image characters corresponding to the second set of text characters extracted by the second OCR operation, and the generating of the document further comprises:
overlaying the second set of text characters on the modified image.

20. The system of claim 19, wherein the initial region is selected to be processed as the image class when a text extraction process, determined by the content class of the initial region, is attempted but fails.

* * * * *